No. 663,330. Patented Dec. 4, 1900.
R. M. DIXON.
GASKET AND GASKET SECURING MECHANISM.
(Application filed Aug. 18, 1900.)
(No Model.) 2 Sheets—Sheet 1.
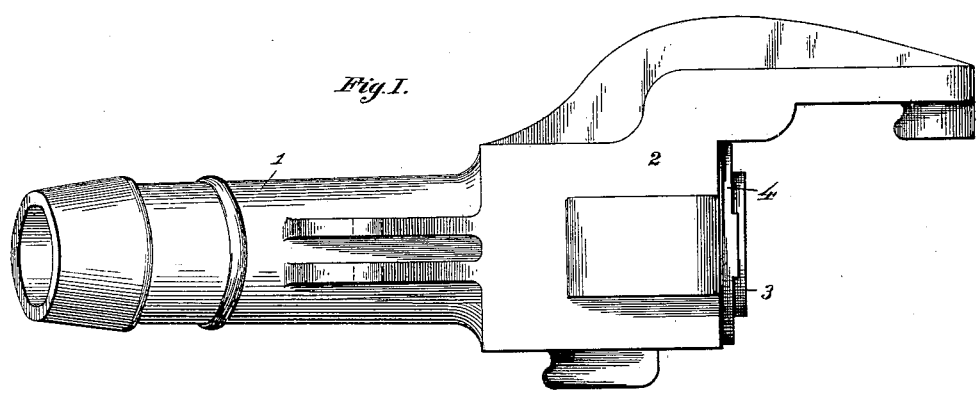
Fig. I.
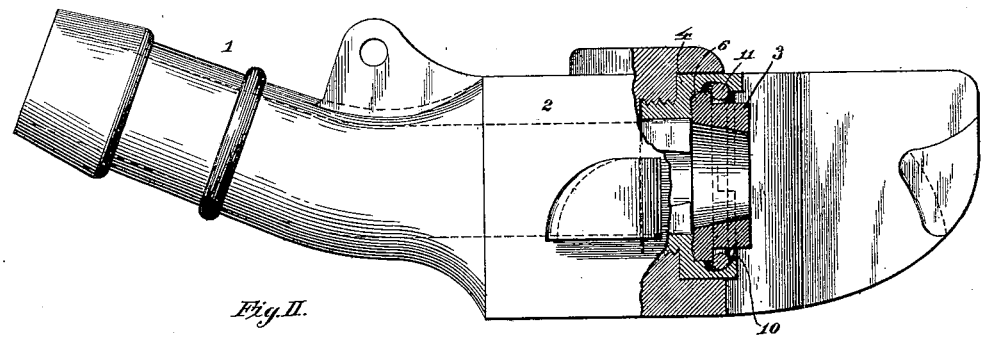
Fig. II.
Witnesses
Inventor:
Robert Nunn Dixon,
By Joseph L. Atkins
Attorney.
THE NORRIS PETERS CO., PHOTO-LITHO., WASHINGTON, D. C.

No. 663,330. Patented Dec. 4, 1900.
R. M. DIXON.
GASKET AND GASKET SECURING MECHANISM.
(Application filed Aug. 18, 1900.)
(No Model.) 2 Sheets—Sheet 2.
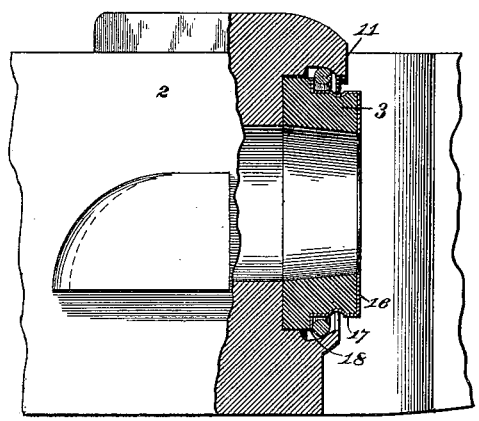
Fig. III.
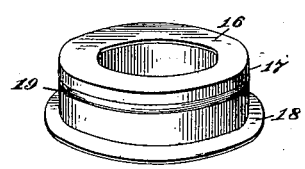
Fig. IV.
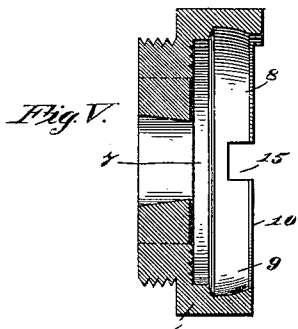
Fig. V.
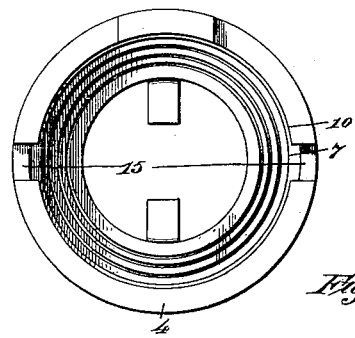
Fig. VI.
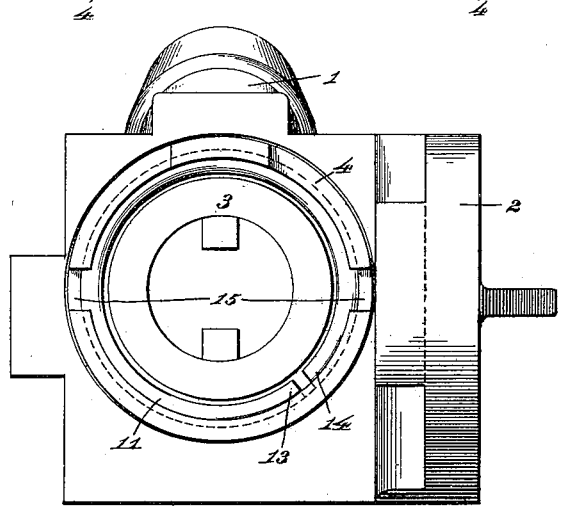
Fig. VII.
Witnesses
Inventor:
Robert Munn Dixon
By Jasper L. Atkins
Attorney

UNITED STATES PATENT OFFICE.

ROBERT MUNN DIXON, OF EAST ORANGE, NEW JERSEY.

GASKET AND GASKET-SECURING MECHANISM.

SPECIFICATION forming part of Letters Patent No. 663,330, dated December 4, 1900.

Application filed August 18, 1900. Serial No. 27,273. (No model.)

*To all whom it may concern:*

Be it known that I, ROBERT MUNN DIXON, of East Orange, in the county of Essex, State of New Jersey, have invented certain new and useful Improvements in Gaskets and Gasket-Securing Mechanism, of which the following is a complete specification, reference being had to the accompanying drawings.

The object of my invention is to produce an improvement in gaskets and in means for securing gaskets in place, as in straight-port hose-couplers.

My invention is especially but not exclusively adapted for use in couplers for connecting the terminals of train-pipes in car-heating systems.

In the accompanying drawings, Figure I is a top plan view of one-half of a hose-coupler equipped with my device. Fig. II is a side elevation of the subject-matter of Fig. I, partially in section. Fig. III is a sectional view of a portion of the subject-matter of Fig. II, showing my armored gasket and secured without the intervention of the gasket-ring shown in Fig. II. Fig. IV is a perspective view of the armor-cap shown in Fig. III. Fig. V is a diametrical section of the gasket-ring shown in Fig. VI. Fig. VI is a front elevation of the gasket-ring detached. Fig. VII is a front elevation of the subject-matter of Fig. II, the parts being shown in full.

Referring to the numerals on the drawings, 1 indicates a stem by which the coupler is united to a hose, and 2 the body part of the coupler. The parts referred to are shown merely by way of example, and the coupler being familiar in the art requires no particular explanation.

3 indicates a compressible gasket made of vulcabeston, rubber, or any other suitable yielding material. It is designed to surround the mouth of the bore of the coupler and to coöperate with the corresponding member carried in a twin coupling member to constitute a tight joint between their contacting surfaces.

I prefer to seat the gasket in a gasket-ring 4, fitting and threaded into a recess formed to accommodate it in the end of the body part 2, as shown in Fig. II, for example; but the gasket may be seated directly in the body part, as shown in Fig. III, without the intervention of the gasket-ring.

Having premised, therefore, that the gasket-seat may be located in a gasket-ring or in the body part of a coupler or like member and noting that the gasket-seat whether formed in the ring or in the body part of a coupler is identical in so far as it constitutes a gasket-receptacle, it will suffice to explain the structural features of the gasket-seat as formed in the ring. (Compare Figs. II, V, and VI.)

The gasket 3 is provided around its base with an annular flange 6, and to accommodate the said annular flange the gasket-seat is provided in its inner end (see Fig. V) with an annular recess 7. Beyond the recess 7 is formed in the end of the gasket-seat an annular recess 8, which is of larger diameter than the recess 7, but whose distinctive characteristic is found in an inwardly-flared or conical bounding-wall 9. It is preferable that the greatest diameter of the recess 8 should be located adjacent to the recess 7 and that the outer edge 10 of the recess 8 should be substantially coextensive in diameter with the recess 7. Consequently the recess 7 being made to fit the flange 6 of the gasket the gasket may be readily introduced through the recess 8 and there secured by the retaining mechanism, which I shall now describe.

The retaining mechanism consists, essentially, of a resilient ring 11, which when inserted into the recess 8 holds itself in place against the wall 8, the incline of which is designed to prevent its accidental dislodgment. The ring 12 is not continuous, but, in order to render its resiliency available for the purpose specified, terminates in separate but nearly-contiguous ends 13 and 14, as clearly indicated in Fig. VII. When the ring 12 and the gasket 3 are in place within the gasket-seat, as shown, for example, in Fig. II, the ring by engagement with the flange 6 of the gasket affords secure means for holding the gasket firm in its seat. Moreover, the width of the gasket-flange 6 being greater than the depth of the recess 7, into which it fits, and being made of yielding material exerts an elastic force against the ring 12, tending to crowd it toward the edge 10 of the recess 8, and thereby to insure its constant operative engagement with the flange 6 of the gasket. The wall of the gasket-seat—for example, the ring 4, as clearly shown in Figs. V, VI, and VII—is preferably provided with diametrically opposite niches 15, which not only afford means for screwing the ring into place if the ring be employed, but also on account of their depth, as indicated in dotted lines in Fig. II, afford means for the insertion of a tool adapted to compress the ring 12 for introducing and extracting it.

The gasket 3, previously described, being composed of a yielding material, as specified, is such as is generally employed in the art for the purpose specified. Such gaskets, however, being in practice subjected to rough usage require frequent renewals and are therefore a source of not inconsiderable expense. I propose to protect them against excessive wear and at the same time to preserve those qualities which enable them to perform their required functions by the employment of a metallic armor, as of brass, which is clearly illustrated in Figs. III and IV. The armor consists of an annular internal flange 16, extending from a cylindrical body part 17, to the base of which is united an external annular flange 18. The flange 16 covers and protects the face of the gasket, while the body part 17 and the flange 18 afford the means for securing the flange 16 in place. The periphery of the cylinder 17 is annularly grooved or indented, as illustrated, in order that the cylinder itself may secure a purchase upon the material of the gasket; but in conjunction with my ring 12, as previously specified, the flange 18 may be mainly relied upon to hold the armor-cap, consisting of the parts 16, 17, and 18, in place. It should be observed in this connection that the flange 18 rests upon and is supported by the unconfined portion of the annular base 6 of the gasket and that therefore the cap is projected outwardly by a yielding member of sufficient resiliency to enable the flange 16 to perform the function required of it.

What I claim is—

1. The combination with a gasket-seat-containing member, and a gasket, of an inclined wall, in the containing member, surrounding the gasket, and a resilient ring in direct contact with and confined by said wall, and adapted to hold the gasket in place.

2. The combination with a gasket-seat-containing member said gasket-seat comprising an annular recess and a second recess concentric with the first and defined by an inclined wall, of a gasket provided with an annular flange seated within the first-named recess and a resilient ring seated within the second recess against its inclined wall and the flange of the gasket respectively.

3. The combination with a gasket-seat-containing member said seat comprising an annular recess and a corresponding recess defined by an inclined wall, of a gasket provided with a flange seated within the first-named recess, and a resilient ring confined between the inclined wall and the flange of the gasket and urged by the resiliency of the latter against the former.

4. The combination with a gasket-seat-containing member adapted to receive a gasket and its retaining-ring, of niches in the wall which defines the gasket-seat adapted to expose the ring therein substantially for the purpose specified.

5. The combination with a gasket made of yielding material, of a metallic armor-plate secured to the gasket and adapted to protect the face thereof, substantially as set forth.

6. The combination with a gasket-seat-containing member comprising an annular recess and a corresponding recess defined by an inclined wall, of a gasket having a flange seated in the first-named recess, an armor-cap upon the gasket provided with the flange seated upon the gasket-flange, and a resilient ring confined between the inclined wall and the flanges of the cap and gasket.

In testimony of all which I have hereunto subscribed my name.

ROBERT MUNN DIXON.

Witnesses:
FREDERICK E. KESSINGER,
OLIVER S. PICHER.